United States Patent Office 3,299,842
Patented Jan. 24, 1967

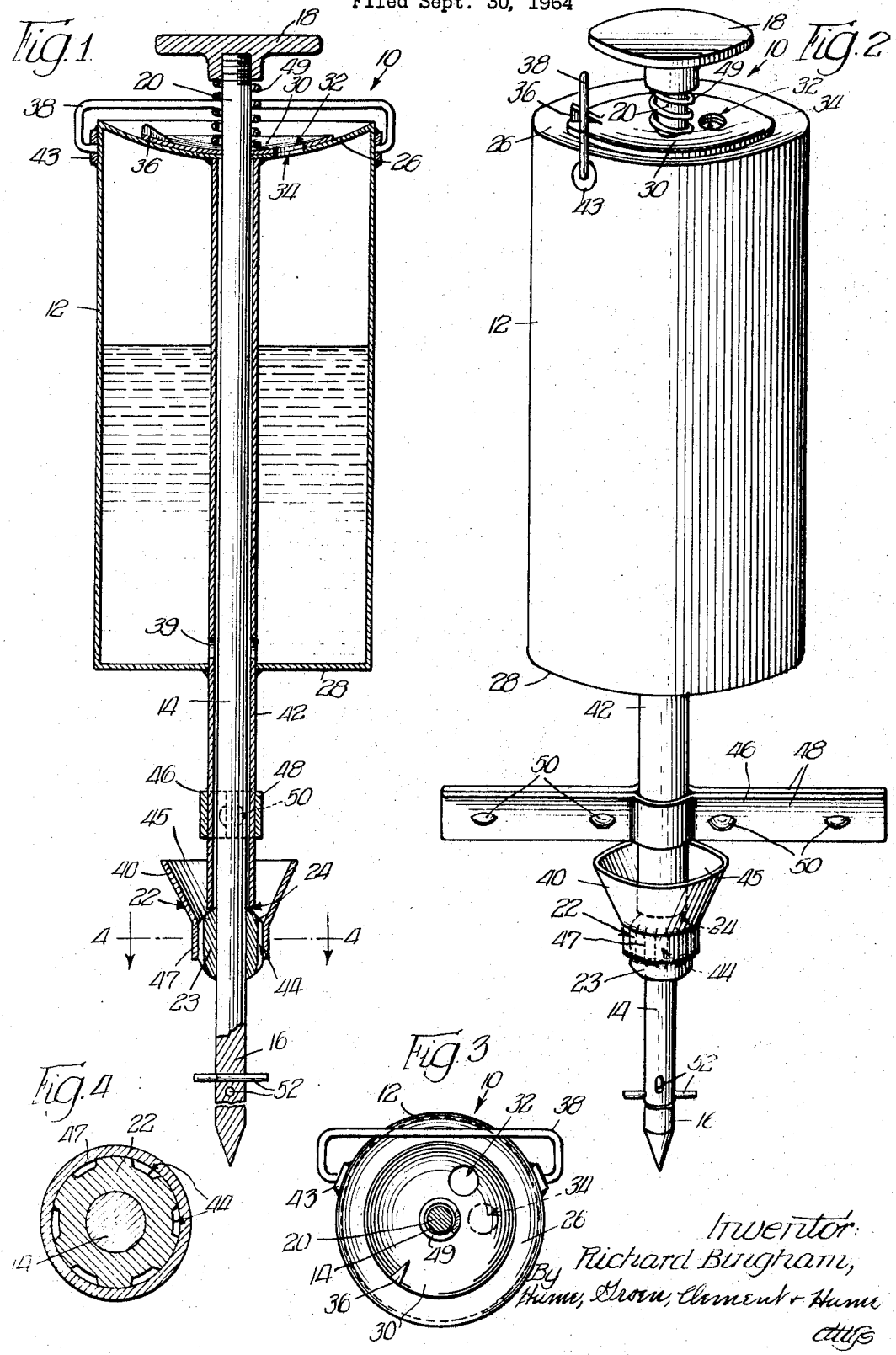

3,299,842
WEED KILLING APPARATUS
Richard Bingham, 1732 N. Park Ave.,
Chicago, Ill. 60650
Filed Sept. 30, 1964, Ser. No. 400,326
4 Claims. (Cl. 111—7.2)

The present invention relates to plant treatment means and more particularly to an apparatus for killing weeds.

A persistent problem in the care of lawns, golf courses, gardens, or other small cultivated areas is the destroying of unwanted plants. Various mechanical and chemical devices have been developed to cope with this problem. The mechanical weed killing devices are often too complex, heavy, or expensive for use on a relatively small scale. Further, they may require considerable exertion to remove the weed, or they may disturb the soil and injure adjacent grass or other plants. Conventional chemical weed killing methods are expensive, and where conventionally applied above the soil surface to the leaves of the weeds the chemicals may constitute a danger to other plants, animals, or humans. A principal disadvantage of both mechanical and chemical weed killers is that they frequently fail to permanently destroy the weed because the weed regrows from its undestroyed roots, or portions thereof.

It is an object of the present invention to provide novel means for weed killing which overcome the above and other disadvantages of prior art apparatus.

It is a general object of the present invention to provide a new and improved weed killing apparatus.

It is an object of the present invention to provide a weed killing apparatus which is simple, inexpensive, easily operated, and effective to destroy weeds at their roots.

It is a specific object of the present invention to provide a mechanical means for applying a selected quantity of any weed killing liquid solution into the interior of the soil so as to destroy a weed root system, comprising a liquid container means, a guide means adapted to be driven into the soil and to conduct the liquid solution therein, and valve means for controlling the discharge of liquid from the container onto the guide means.

Further objects and advantages of the invention pertain to the particular arrangements and structure whereby the above-identified objects and other objects of the invention are attained.

The invention will be better understood by reference to the following specification and drawings forming a part thereof, wherein:

FIGURE 1 is a partial cross-sectional side view of a plant treatment apparatus embodying the features of the present invention;

FIGURE 2 is a perspective frontal view of the plant treatment apparatus of FIGURE 1;

FIGURE 3 is a top view of the plant treatment apparatus of FIGURE 1 with a handle removed, and;

FIGURE 4 is a cross-sectional view of the plant treatment apparatus of FIGURE 1 taken along the line 4—4 of FIGURE 1.

Turning now to the drawings, and referring particularly to FIGURE 1, there is shown therein a weed killing apparatus 10 embodying the present invention. Specically, the apparatus 10 includes a container 12 adapted to hold a supply of liquid weed treatment solution, an elongate rod 14 extending vertically through the container 12 having a pointed end 16 for driving beneath the surface of the soil, and a valve 22 secured to the rod providing a fluid-tight fit at an outlet 24 of the container. Upon the insertion of the end 16 of the rod 14 into the ground and lifting of the container 12 with respect to the rod 14, liquid passes out of the outlet 24 and down the rod 14 into the ground at the precise point selected, thus providing a direct chemical treatment of the weed roots.

Referring in greater detail to the container 12, this container is intended to provide a portable lightweight chamber with a convenient liquid capacity. The container 12 is constructed to be fluid tight when supported in a vertical position. It may be of any convenient configuration or material, and is shown here as a thin-walled cylindrical container of metal, plastic, or other suitable material. Both an upper end 26 and a lower end 28 of the container 12 are provided with small openings therethrough somewhat larger than the diameter of the rod 14, so that the rod 14 fits freely and slidably through the container 12, projecting from both ends thereof. Thus the container 12 is in effect slidably secured to the rod 14.

For convenience of filling of the container 12, the upper end 26 may be formed as a concave surface. An exemplary cover and filling arrangement is provided by a rotating cover 30, best seen in FIGURE 3. The cover 30 is adapted to rotate about the rod 14 while bearing against and closing the upper end 26 of the container 12. It has an opening 32 adapted to align or match up with a similar opening 34 in the upper end 26. When the cover 30 is rotated by means of an upwardly projecting tab 36 thereon to achieve this alignment (as in FIGURES 1 and 2), the container 12 may be conveniently filled with the selected weed treatment liquid.

The container 12 has secured thereto a lifting handle 38 for vertically lifting the container 12 and its contents with respect to the rod 14. The lifting handle 38 is preferably operated by one hand in conjunction with an operating handle 18 on the rod 14, and is therefore mounted over one side of the upper end 26 of the container 12. As shown here the lifting handle 38 comprises simply a conventional bent wire handle pivotally retained at each end by two conventional handle supports 43 secured at opposing sides of the container 12 near the upper end 26. This particular handle arrangement is merely exemplary and a variety of rigid or flexible arms or other suitable handles could be provided.

The lower extremity of the container 12 includes herein a thin-walled tubular extension 42. This extension 42 is an extension of the liquid container 12 and is adapted to have a portion of the rod 14 fit slidably therethrough in a substantially closely spaced relationship. The extension 42 provides reinforcing for the container 12 by extending up through the container and securing the upper end 26 to the lower end 28. The openings 39 through the extension 42 provided near the lower end 28 of the container allow fluid to pass freely into the space between the interior surface of the extension 42 and the rod 14.

At the lowest extremity of the container 12, which in this case is the lower extremity of the extension 42, there is provided the liquid outlet opening 24 for the container 12. This liquid outlet 24 is only somewhat larger in diameter than the rod 14 which fits slidably therethrough. Here the outlet 24 comprises simply the circular lower end of the tubular extension 42. The extension 42 preferably extends downward to enclose the rod 14 for substantially all of the length of the rod 14 not enclosed by the container 12 or adapted to be inserted into the ground. For convenience in the drawings herein the extension 42 is shown reduced in length in relation to the size of the other components.

The valve 22, which is secured to the rod 14, provides the closure means for the above-described liquid outlet 24 from the container 12. The valve 22 as shown here comprises basically a rounded annular projection 23 from the rod 14 of rubber or other suitable resilient material. It may be secured to the rod 14 by having a central hole therethrough, through which the rod 14 is passed and secured by cement, projections from the rod, or other suitable means. This connection between the valve 22 and the rod 14 is fluid tight.

Due to the resilient nature of the continuous annular projection 23, a secure fluid-tight seal is provided between the outlet 24 and the rod 14. As the container 12 is slidably mounted upon the rod 14, which extends through the outlet 24, the container 12 in its normal vertical configuration will slide by gravity down the rod 14 until the lower extremity of the extension 42 (forming the outlet 24) evenly abuts and rests or "seats" upon the valve 22. Thus the projection 23 of the valve 22 supports the weight of the container 12, and the weight of the container 12 and its contents serves to maintain the outlet 24 in a normally closed position.

As stated above, the exterior surface configuration of the resilient projection 23 is preferably generally rounded. This is so that when the valve 22 is open and liquid runs out the outlet 24, substantially all of this liquid will flow directly over the outer surface of the projection 23 and then onto and down the exterior surface of the rod 14 below the valve, without dripping off.

A further provision of the valve 22 is a small funnel shaped liquid container 40 mounted around the resilient projection 23. A cylindrical base 47 of this container 40 provides a continuous sleeve contacting the resilient annular projection 23. The resilient annular projection 23 is provided with a plurality of shallow vertical grooves 44 therein so as to provide between the projection 23 and the inner surface of the cylindrical base 47 a plurality of small fluid passageways of restricted cross-sectional area, as seen in FIGURE 4. The liquid container 40 preferably includes an open container portion 45, integral with the base 47. This container portion 45 is adapted to hold the fluid released from the liquid outlet 24 until it can pass through the fluid passageway at the grooves 44. Being open, it provides a direct visual indication of the quantity of fluid discharged from the outlet 24.

Turning to the rod 14 itself, the rod provides support for the container 12 and the lower pointed end 16 is adapted to be driven into the soil up to 6 inches or more. Accordingly, the rod 14 should have sufficient strength and stiffness and is preferably constructed from cylindrical metal stock or other suitable material. The rod 14 extends longitudinally the full length of the apparatus 10, and has its upper extremity 20 extending from the upper end 26 of the container 12. Upon this upper extremity 20 there is secured a handle 18 adapted to receive downward forces from the hand of the operator sufficient to drive the lower pointed end 16 of the rod into the soil. It will be noted that in this arrangement the vertical force necessary to drive the rod into the soil is transmitted solely by the rod and therefore the container 12 does not have to be adapted to transmit this force. The lower end 16 of the rod 14 is preferably pointed or rounded to aid in penetration of the soil. The length of the rod is preferably such that the apparatus 10 may be conveniently operated from a standing position (for example approximately three feet). A coil spring 49 may be mounted around the upper extremity 20 of the rod 14, compressed between the operating handle 18 and the rotating cover 30. This provides a downward force upon the container 12, biasing the container 12 against the valve 22.

A principal function of the rod 14, that portion of it below the valve 22, is to provide a guide means for conducting substantially all of the liquid weed killing solution released from the container 12 down into the soil at a selected point by means of liquid flow down the exterior of the rod, as will be described herein. It will be noted that this liquid flow is accomplished down the exterior of the rod, not through the interior, and therefore is not subject to interruption by clogging.

While not essential, it is preferred to provide a foot bar 46 rigidly secured to the lower end of the extension 42. The foot bar 46 is a rigid projection transverse the extension 42 extending out on opposite sides a sufficient distance to provide a suitable area for foot pressure thereon. It provides convenient means by which additional force may be directly applied by the operator in a downward direction upon the rod 14 to assist in driving the lower end 16 of the rod 14 into the soil. As shown here, the foot bar 46 may be constructed for example from two generally planar straps 48 of steel or other suitable material each having a curved center portion fitted around the extension 42. The straps 48 may be tightly secured to each other and against the extension 42 by means of conventional rivets 50. Additional fastening such as welding or glue may also be provided.

A further feature preferably provided upon the rod 14 comprises one or more small diameter pins 52 projecting a short distance from the rod near the lower extremity. The pins 52 may be constructed from small steel rods or other suitable materials secured through corresponding holes through the rod 14 preferably at right angles and spaced a few inches above the lower extremity of the rod. The pins 52 are adapted to cut or break weed roots and to assist in the removal of the weeds, as will be explained herein.

Turning now to the operation of the apparatus 10, this operation is characterized by speed and convenience, the permanent destruction of the weed by destruction of its roots, the absence of injury to adjacent grass or other plants, and the safe application of chemicals beneath the soil surface. The container 12 is first filled with a selected weed killing liquid by the filling arrangement previously described. The particular liquid solution selected may be any of the conventional weed killing chemical solutions. However, the apparatus 10 may also employ economical caustic or acid solutions (such as ordinary lye) or any other suitable safe liquid solution which is poisonous to plants when applied in a concentrated area in the root system. Since the valve 22 is normally closed by the weight of the container 12 and also by the coil spring 49, the apparatus 10 may be conveniently carried by the operating handle 18 without danger of spilling any of the liquid solution.

To destroy a selected weed the apparatus 10 is placed in a substantially vertical operating position over the weed and the pointed end 16 of the rod 14 is driven beneath the soil surface in the immediate vicinity of the weed for a suitable distance, driving a hole in the soil into the root region of the weed. Preferably this hole is then enlarged somewhat by a few horizontal movements of the operating handle 18. To apply the weed killing solution the lifting handle 38 is lifted upwards by the operator while the rod 14 remains in position, inserted in the soil. This unseats the valve 22 and allows the liquid to flow from the container over the resilient projection 23. Due to the construction of the projection 23 and its association with the rod 14, the liquid will flow through the passageways formed by the vertical grooves 44 and down onto the rod 14, and then continue flowing down the exterior of the rod 14 to the pointed end 16 and into the hole made in the soil. Substantially all of the liquid is thereby deposited beneath the soil surface directly in the root region of the weed where it can quickly be absorbed by, and act upon, the root system.

The restricted nature of the fluid passageways formed by the grooves 44 and the adjacent base 47 of the liquid container 40 causes the flow of liquid to be restricted so that the liquid will flow evenly downward on the rod 14 without dripping off. Further this restriction causes substantially all of the liquid discharged from the outlet 24 to initially collect within the open container portion 45 of the liquid container 40. This provides by the level of the liquid therein a direct visual indication of the total amount of the liquid discharged, and thereby provides an indication to the operator as to when to release the lifting handle 38 to prevent the application of an excessive amount of the liquid. The valve 22 automatically closes the outlet 24 upon the release of the lifting handle 38. When all of the released liquid has been guided into the ground by the rod 14, the operating handle 18 may be lifted upwards to easily remove the rod 14 from the soil. The liquid solution deposited quickly acts upon the weed roots to permanently kill the entire weed within a short period of time.

Where pins 52 are provided, an additional step may be performed to physically remove a principal portion of the weed. This is accomplished by rotating the operating handle 18 so that the weed roots and stem are torn or cut and twisted by the pins 52 about the end of the rod 14. Thereby when the rod 14 is removed from the ground, the principal portion of the weed may be pulled out. The remaining roots may be destroyed by the chemical solution as described above.

The apparatus described herein is presently considered to be preferable, however, it is contemplated that further variations and modifications within the purview of those skilled in the art can be made herein. For example, an operable device in accordance with the invention could be constructed without the extension 42 or the liquid container 40 described herein. It is intended to cover in the appended claims all such variations and modifications as fall within the true spirit and scope of the invention.

What is claimed is:

1. A plant treatment apparatus comprising: a portable container adapted to hold a supply of liquid plant chemical solution when in a substantially vertical operating position, having upper and lower ends and a liquid outlet opening in said lower end for discharging said liquid chemical solution; an elongate rod having upper and lower extremities slidably mounted vertically through said opening in said container, projecting from the upper and lower ends of said container respectively, said lower extremity of said rod adapted to conduct liquid from said liquid outlet down the exterior thereof and having an end portion adapted to be driven beneath the soil; valve means secured to said rod for closing said liquid outlet opening comprising an annular projection from said rod adapted to conduct liquid discharged from said liquid outlet opening downwardly over the surface thereof onto said rod; said container means resting upon said valve means in said substantially vertical operating position so as to close said liquid outlet opening; and handle means mounted upon said projecting upper extremity of said rod for forcing said rod downwardly whereby said end portion of said rod may be driven beneath the soil near a plant, said container being movable upwardly with respect to said rod to open said liquid outlet opening so that liquid flows from said container down said rod and beneath the soil at the plant root system.

2. A plant treatment apparatus comprising: a portable container adapted to hold a supply of a liquid plant chemical solution when in a substantially vertical operating position, having upper and lower ends and a liquid outlet opening in said lower end for discharging said liquid chemical solution; an elongate rod having upper and lower extremities slidably mounted vertically through said opening in said container, projecting from the upper ends of said container respectively, said lower extremity of said rod adapted to conduct liquid from said liquid outlet down the exterior thereof and having an end portion adapted to be driven beneath the soil; valve means secured to said rod for closing said liquid outlet opening, said valve means being partially enclosed by a liquid receptacle means adapted to restrict the volume of liquid flow from said valve means and to contain liquid discharging from said outlet opening; said container means resting upon said valve means in said substantially vertical operating position so as to close said liquid outlet opening; and handle means mounted upon said projecting upper extremity of said rod for forcing said rod downwardly whereby said end portion of said rod may be driven beneath the soil near a plant, said container being movable upwardly with respect to said rod to open said liquid outlet opening so that liquid flows from said container down said rod and beneath the soil at the plant root system.

3. The plant treatment apparatus of claim 1 wherein said valve means is partially enclosed by a liquid receptacle means adapted to restrict the volume of liquid flow from said valve means and to contain liquid discharging from said outlet opening.

4. A plant treatment apparatus comprising: a portable container adapted to hold a supply of a liquid plant chemical solution when in a substantially vertical operating position having upper and lower ends and a liquid outlet opening in said lower end for discharging said liquid chemical solution; an elongate solid rod mounted to said container, said rod having a lower portion adapted to be driven beneath the soil; valve means for opening and closing said liquid outlet opening; said liquid outlet opening discharging onto the exterior surface of said rod at an intermediate portion of said rod substantially spaced above said lower portion of said rod adapted to be driven beneath the soil, said rod from said intermediate portion to said lower portion having an exposed exterior surface adapted to conduct liquid from said liquid outlet opening down to said lower portion so that liquid flows from said container down the exterior of said rod to beneath the soil.

References Cited by the Examiner
UNITED STATES PATENTS
2,157,915   5/1939   Olson _____ 111—7.1

FOREIGN PATENTS
108,222   6/1875   France.

ABRAHAM G. STONE, *Primary Examiner.*
ROBERT E. BAGWILL, *Examiner.*